US012581296B2

(12) United States Patent
Rule et al.

(10) Patent No.: US 12,581,296 B2
(45) Date of Patent: Mar. 17, 2026

(54) SYSTEMS AND METHODS FOR USER AUTHENTICATION USING MOBILE NETWORK DATA

(71) Applicant: Capital One Services, LLC, McLean, VA (US)

(72) Inventors: Jeffrey Rule, Chevy Chase, MD (US); Lawrence Douglas, McLean, VA (US); Jackson Macomber, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 339 days.

(21) Appl. No.: 18/488,227

(22) Filed: Oct. 17, 2023

(65) Prior Publication Data

US 2025/0126468 A1     Apr. 17, 2025

(51) Int. Cl.
| | |
|---|---|
| *H04W 12/06* | (2021.01) |
| *H04W 12/63* | (2021.01) |
| *H04W 12/72* | (2021.01) |
| *H04W 84/12* | (2009.01) |

(52) U.S. Cl.
CPC ........... *H04W 12/06* (2013.01); *H04W 12/63* (2021.01); *H04W 12/72* (2021.01); *H04W 84/12* (2013.01)

(58) Field of Classification Search
CPC ..... H04W 12/06; H04W 12/63; H04W 12/72; H04W 84/12
See application file for complete search history.

(56) References Cited

U.S. PATENT DOCUMENTS

| | | | | |
|---|---|---|---|---|
| 9,355,231 | B2 * | 5/2016 | Disraeli | H04L 63/083 |
| 11,991,182 | B2 * | 5/2024 | Zhang | G06N 20/10 |
| 12,075,342 | B2 * | 8/2024 | Saini | H04W 8/205 |
| 2021/0397683 | A1 * | 12/2021 | Liem | H04W 4/027 |
| 2022/0345979 | A1 * | 10/2022 | Tumuluru | H04W 40/20 |
| 2024/0217523 | A1 * | 7/2024 | Mehta | G06N 3/08 |
| 2025/0119358 | A1 * | 4/2025 | Donthireddy | H04L 43/55 |

* cited by examiner

*Primary Examiner* — Liton Miah
(74) *Attorney, Agent, or Firm* — Foley & Lardner LLP

(57) ABSTRACT

Systems and methods for authenticating users based on user location data from various sources are disclosed herein. In some aspects, the system may transmit a first request for network and location information. The system may receive wireless network configuration metadata and location data. The system may transmit a second request for cellular network information. The system may receive cellular network metadata. The system may determine a user location. The system may retrieve a user profile. The system may provide the user location and the user profile to a machine learning model. The system may generate an authentication probability. The system may transmit an authentication message based on the authentication probability.

20 Claims, 5 Drawing Sheets

400

402 — Transmit a first request for network and location information

404 — Receive wireless network configuration metadata and location data

406 — Transmit a second request for cellular network information

408 — Receive cellular network metadata

410 — Determine a user location

412 — Retrieve a user profile

414 — Provide the user location and the user profile to a machine learning model 416 — Generate an authentication probability 418 — Transmit an authentication message based on the authentication probability

| Measurement Descriptor 102 | Timestamp 104 | Attribute 106 | Value 108 |
|---|---|---|---|
| WLAN | 2023-05-07T16:45Z | IP Address | 152.393.29.744 |
| | 2023-05-07T16:45Z | Signal Strength | -63 dBm |
| | 2023-05-07T16:45Z | MAC Address | 00:5d:02:98:88:d4 |
| | 2023-05-07T16:45Z | ISP Identifier | ComWebNet |
| | 2023-05-07T16:45Z | Signal Strength | -70 dBm |
| Cellular Network | 2023-05-07T16:45Z | Transmitter Latitude | 42.8897 |
| | 2023-05-07T16:45Z | Transmitter Longitude | -73.0932 |
| GPS | 2023-05-07T16:48Z | Latitude | 42.124 |
| | 2023-05-07T16:48Z | Longitude | -72.98 |
| | 2023-05-07T16:48Z | Elevation | 404.0 m |

| Location 122 | | Timestamp 124 | Measurement Descriptor 126 |
|---|---|---|---|
| Lat. 128 | Long. 130 | | |
| 47.608013 | -122.335161 | 2023-04-08T12:25Z | GPS |
| 47.608001 | -122.335127 | 2023-04-09T15:43Z | WLAN |
| 47.608003 | -122.335168 | 2023-04-11T11:25Z | GPS |
| 47.608050 | -122.335115 | 2023-04-12T09:20Z | WLAN |
| 47.608023 | -122.335101 | 2023-04-15T10:05Z | Cellular Network |
| 47.608053 | -122.335100 | 2023-04-17T10:07Z | WLAN |

120

400

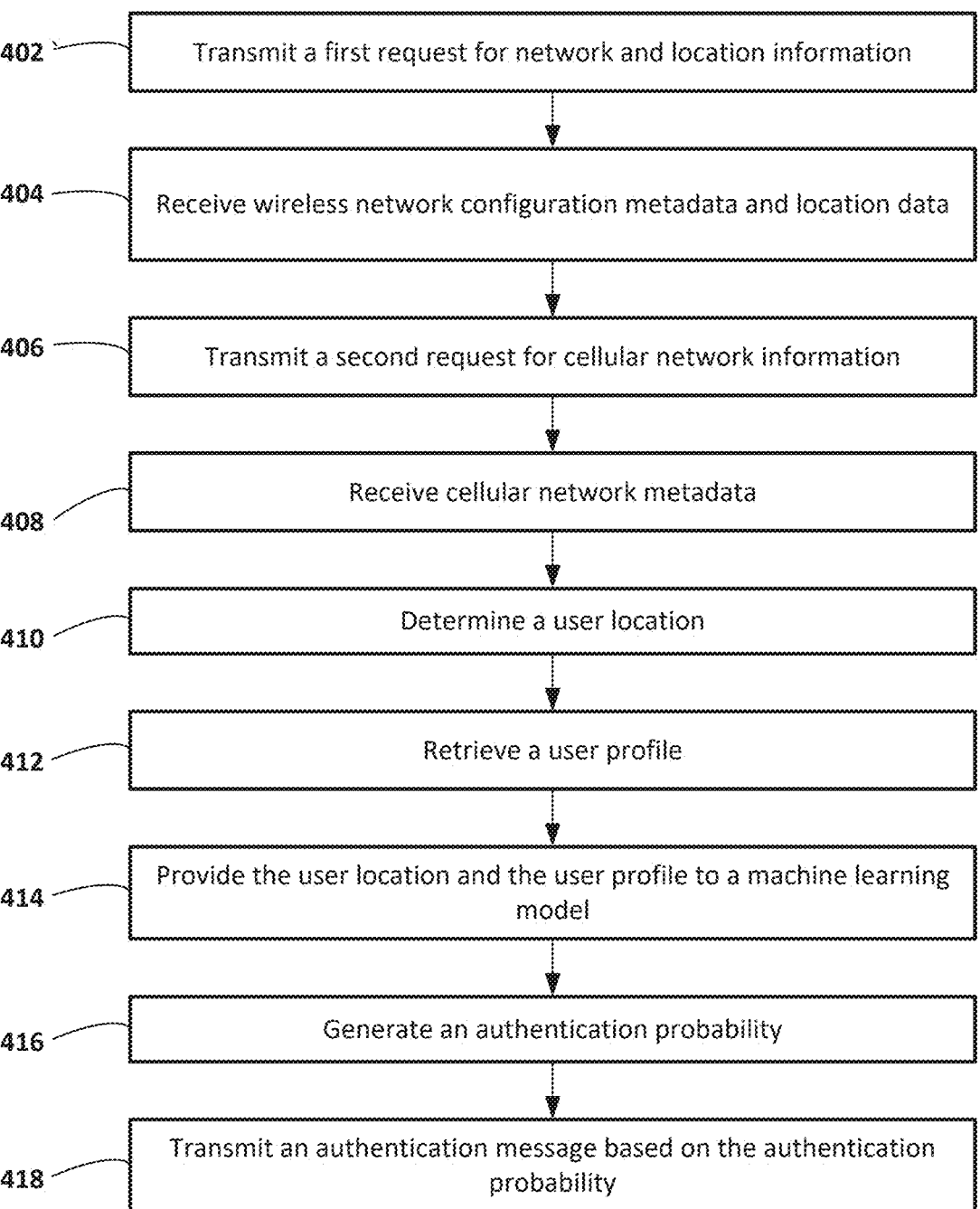

402 — Transmit a first request for network and location information

404 — Receive wireless network configuration metadata and location data

406 — Transmit a second request for cellular network information

408 — Receive cellular network metadata

410 — Determine a user location

412 — Retrieve a user profile

414 — Provide the user location and the user profile to a machine learning model 416 — Generate an authentication probability 418 — Transmit an authentication message based on the authentication probability

FIG. 4

SYSTEMS AND METHODS FOR USER AUTHENTICATION USING MOBILE NETWORK DATA

SUMMARY

Methods and systems are described herein for authenticating users with mobile devices based on wireless local area network (WLAN) data, global positioning system (GPS) data, or cellular network information. As one example, methods and systems described herein enable authentication of users for access to systems, such as cloud computing servers, high-performance computing clusters, or other secure systems, which may require verification of users prior to provision of access. The system may determine a user's location using metadata associated with a corresponding user device, such as mobile network data, GPS data, or Wi-Fi data, in order to determine the location of the user and authenticate the user accordingly. By analyzing a user's present location with respect to locations at which an authorized user was previously detected, the system may generate a probability that the user corresponds to an authorized user of the system, thereby determining an authentication status for the user.

Existing systems may authenticate a user based on user credentials stored by the system upon the user's initial registration. For example, upon a request from a user to access an electronic resource such as a secure cloud server, a conventional system may transmit an authentication challenge requesting a username and password associated with the user to validate that the request originated from an authorized user. In some cases, an authentication challenge may include other requested measurements or characteristics of a user, such as a fingerprint scanner verification or a picture of the user's face as captured by a mobile device. Conventional systems may verify whether such details match information associated with a user previously authorized to access the secure system in question, such as user registration data. However, such conventional systems can fall prey to malicious attacks or hacking by external parties who steal user data and present it as genuine. For example, hackers or other malicious entities may acquire user facial data or fingerprint data, as well as user credentials, and present such data as supposed proof of the presence of the authorized user. Even in situations where a user device's current location is accounted for during verification, conventional systems may not be able to determine accurately whether a user's location is consistent with a user's behavior, as rule-based systems may miss situations where a user acts in an unhabitual manner, such as during vacations or emergencies. As such, conventional systems may fail to detect situations where users may be easily impersonated, while erroneously denying a user's verification during new or unexpected movement of the user, thereby weakening the security and accessibility of the underlying secure system to be accessed.

To overcome these technical deficiencies in conventional authentication systems, methods and systems disclosed herein leverage multiple sources of location data associated with a user's device to evaluate whether a user requesting authentication is indeed the authorized user of the secure system for which access is requested. For example, the system may receive GPS or WLAN data in order to generate an indication of the user's location. Additionally or alternatively, the system may leverage mobile network data (e.g., cellular network data) in order to bolster and validate this location information. Based on determining a location associated with the user device associated with the authentication attempt, the system may retrieve a mapping of the user's previous locations in order to determine a likelihood that the user device's present location corresponds to the user's ground-truth present location (e.g., using a machine learning model trained on multiple users' location data and authentication statuses). By comparing this likelihood (e.g., an authentication probability) to a threshold value, the system may determine whether to request the reauthentication of the user. Solving this technical problem provides the practical benefit of quantifying the probability that a user is authentic (e.g., corresponds to an authorized user of the system) based on multiple sources of location-based data from the user's mobile device, thereby improving the system's robustness to erroneous location indications, such as if the mobile device is connected to a virtual private network. Thus, the system reduces the need for a user to resubmit credentials for reauthentication while ensuring the continued security of the system, thereby improving system accessibility and safety.

In some aspects, the system may transmit a request for network and location information associated with a user requesting authentication. For example, the system may transmit a first request to a mobile device associated with a user, the first request including a request for network information and location information associated with the user. As an illustrative example, the system may transmit an indication to a user's mobile phone requesting permission for accessing location or network-related data in order to authenticate or reauthenticate the user for access to a desired secure system, such as a cloud computing platform's web application. By requesting such location information, the system provides users with control over the data shared with the system, enabling control of user privacy settings with respect to authentication.

In some aspects, the system may receive wireless network-related metadata and location data based on the request. For example, the system may receive, from the mobile device, wireless network configuration metadata, and location data based on the first request. As an illustrative example, the system may receive information relating to any Wi-Fi or WLAN transmitters connected to the mobile phone, including associated internet protocol (IP) addresses or media access control (MAC) addresses. In some implementations, the system may receive location-based information directly, such as latitude, longitude, or elevation information as generated by a GPS receiver on a mobile phone (e.g., the mobile device). Receiving information regarding the connectivity and location of the user's mobile device enables the system to determine the user's authentication status more accurately, as the system may account for the user's claimed location or network configuration in validating a user's access to the cloud computing platform, for example.

In some aspects, the system may transmit a second request to the mobile device for further network information. For example, the system may transmit a second request to the mobile device, the second request requesting cellular network information by deactivation of wireless network connectivity. As an illustrative example, the system may transmit a request to a user's mobile phone for temporary deactivation of the Wi-Fi connection in order to receive information relating to the device's cellular network configuration. For example, the system may transmit a command that results in a push notification on the user's phone requesting deactivation of WLAN capabilities. By doing so, the system enables the user's mobile device to provide further contextual information relating to the physical location of the device, thus improving data with which to evaluate a user's authentication status for continued access to a cloud computing platform's web application.

In some aspects, the system may receive cellular network metadata in response to the device's deactivation of wireless network connectivity. For example, based on the deactivation of the wireless network connectivity, the system may receive cellular network metadata from the mobile device. As an illustrative example, a mobile phone connected to a cloud computing platform's web application may switch from Wi-Fi to a mobile network in response to temporary deactivation of wireless network capabilities. In response, the system may connect to a nearby cellular network and transmit configuration data relating to this new connection to the system for further validation and authentication. By doing so, the system may leverage further information relating to, for example, the location or circumstances of a mobile device in order to determine whether the mobile device is likely in possession of an authorized user of the secure system.

In some aspects, the system may determine a first user location based on the wireless network configuration metadata, the location data, and the cellular network metadata. As an illustrative example, the system may generate estimated locations of the user device based on GPS latitude information, longitude information, or elevation information. The system may generate estimated locations using Wi-Fi-indicated location information (such as through IP address or internet service provider (ISP) tracking). The system may generate estimated locations using cellular network information, such as through triangulation using signal strength to various connected cellular base stations. By doing so, the system may detect a user's location as indicated by the user's mobile device. The system may leverage location data from multiple sources (e.g., GPS, Wi-Fi, or cellular network information) in order to improve the accuracy of user location determination.

In some aspects, the system may retrieve a user profile from a user profile database, where the user profile includes previous user location information. For example, the system may retrieve a user profile from a user profile database, wherein the user profile includes a geographical mapping of user locations previously associated with the user based on wireless network user data, location user data, and cellular network user data. As an illustrative example, the system may retrieve stored information regarding the travel habits of the user based on prior locations at which the user was detected, including corresponding timestamps. By retrieving such information, the system may determine whether the user's currently determined location is consistent with the user's habits or prior behavior. As such, the system may make better decisions as to the authenticity of a given user's authentication attempt based on whether the user's detected location is as expected.

In some aspects, the system may provide the first user location and the user profile to a machine learning model. In response, the system may generate a probability that the user of the authentication request is indeed the authorized user. For example, based on providing the first user location and the user profile to the machine learning model, the system may generate an authentication probability, wherein the authentication probability indicates a likelihood that the first user location corresponds to a present location of the user. As an illustrative example, the system may provide a list or mapping of geographical locations at which the user was previously detected to an artificial neural network trained on authentication attempt data. The system may also provide the user's current location as measured using GPS, Wi-Fi, or cellular network information to the machine learning model. In response, the system may generate a probability indicating a likelihood that the user of the mobile device is indeed the claimed, authorized user, thereby providing the system with information relating to the user's trustworthiness or authentication status.

In some aspects, the system may transmit an authentication message to a server based on the authentication probability. For example, based on determining that the authentication probability is less than a threshold authentication probability, the system may transmit an authentication message to a server, where the authentication message indicates a reauthentication request for the user. As an illustrative example, the system may determine, based on the authentication probability, that the user's measured location likely indicates that the user is a malicious entity, as the location is not consistent with the authorized user's previous travel. The system may determine this indication based on comparing the authentication probability with a threshold probability. As such, the system may send a message to the user, for example, requesting reauthentication (e.g., re-entry of user credentials or other authentication challenges). Alternatively or additionally, the system may indicate that the user is already authenticated by, for example, redirecting a user interface on the mobile device to a landing page or enabling access to the cloud computing platform's web application, as requested by the user. Thus, the system may leverage information relating to the user's current and prior locations in order to improve system sensitivity to malicious attempts to access a cloud computing platform or another secure system.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows an illustrative data structure of wireless network configuration metadata, cellular network metadata, and global positioning system (GPS) metadata, in accordance with one or more embodiments.

FIG. 4 shows a flowchart of the steps involved in determining whether to request reauthentication of a user based on the user's location indicated by WLAN, GPS, or cellular network information, in accordance with one or more embodiments.

DETAILED DESCRIPTION

Figures 1B, 1C:
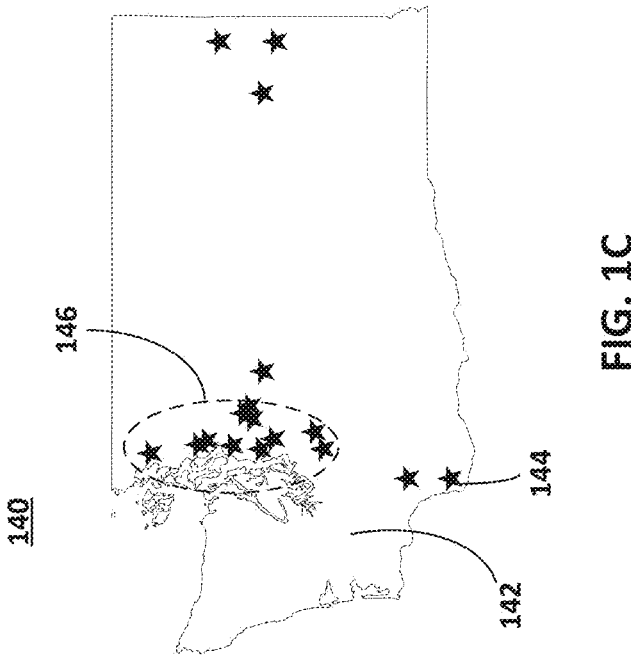
FIG. 1B shows an illustrative data structure of a user profile that specifies locations previously associated with a user based on wireless network, GPS, and cellular network data, in accordance with one or more embodiments.
FIG. 1C shows an illustrative schematic of a geographical mapping of user locations previously associated with a user based on wireless local area network (WLAN), GPS, and cellular network data, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows illustrative data structure 100 of wireless network configuration metadata, cellular network metadata, and global location (e.g., global positioning system (GPS)) metadata, in accordance with one or more embodiments. For example, the system may receive information relating to a user's user device (e.g., a mobile device), where the information includes data from various sources, such as wireless local area network (WLAN), cellular network, or GPS data. The system may store such information in data structure 100. For example, data structure 100 may include measurement descriptors 102 characterizing the nature of the received information (e.g., how the information was measured or the device/protocol with which it is associated). The system may store timestamps 104 corresponding to the information, as well as attributes 106 describing the information itself. Additionally or alternatively, data structure 100 may include values 108 corresponding to attributes 106 characterizing the received data.

For example, the system may generate a request, such as a request for network information (e.g., wireless network data) and location (e.g., GPS) information from a user's device in order to authenticate the user. For example, the system may cause a notification on a user's mobile device, where the notification requests permission to access location data and/or wireless network connectivity data from the user's device. By doing so, the system may request additional information that may be helpful in determining the authenticity of the user, while ensuring that a user may consent prior to gathering such location information from the user. Network information may include information relating to the network configuration of a device, including wireless network data, which may include data relating to a wireless network connected to a mobile device. For example, wireless network data may include information relating to WLAN connections (e.g., connections to Wi-Fi routers), as well as associated information, such as internet service provider (ISP) information relating to the corresponding Wi-Fi connection. In some embodiments, network information may include information regarding other types of network connections, such as satellite, virtual private network, or wired (e.g., broadband/ethernet, digital subscriber line (DSL), or integrated services digital network (ISDN)) connections. By collecting such network information relating to a user of a secured system (e.g., a cloud computing service), the system may determine whether a user is authenticated with respect to the system given network information, such as the user's network-determined location.

For example, as shown in FIG. 1A, the system may receive network information within data structure 100 that includes WLAN configuration metadata. For example, WLAN configuration metadata may include information relating to how a user's mobile device is configured with respect to a WLAN. WLAN configuration metadata may include, for example, an IP address associated with the user's connection, such as an IP address corresponding to an ISP of the WLAN connection (e.g., a Wi-Fi-related ISP). In some embodiments, the network configuration metadata may include a signal strength, which may indicate a relative distance of the user from a wireless network node (e.g., from a WLAN router). In some embodiments, WLAN configuration metadata may include media access control (MAC) addresses, which may identify the mobile device, the router providing the WLAN connection, or any device associated with the WLAN connection. In some embodiments, WLAN configuration metadata may include an ISP identifier, such as a brand name or another identifier associated with a given ISP. In some embodiments, configuration metadata may include information relating to other types of wireless networks (e.g., wireless network configuration metadata), including information relating to wireless network meshes, personal area networks, metropolitan-area networks, or wide-area networks. Such information may enable the system to determine a location for the user (e.g., by looking up a location associated with the corresponding IP address). By collecting such information relating to a user's network connection through a mobile device, the system may acquire information that aids in evaluating the veracity or authenticity of the user, such as whether an authorized user of the cloud computing service is still in possession of a given mobile device based on a location indicated by the network information.

In some embodiments, the system may receive location data relating to the mobile device. For example, location data may include information indicating a location associated with a mobile device, such as GPS information. GPS information may include information relating to a GPS connection between a device and a satellite. The system may generate a request for such information from a mobile device associated with a user. In response, the system may receive information relating to a mobile device's location as measured through GPS (e.g., GPS data). For example, GPS data may include information relating to signal strength values with respect to GPS signals received from satellites used to determine the mobile device location. In some embodiments, the system may determine an estimate for the location of the mobile device based on signals from multiple satellites. Based on these signals, the system may determine a latitude, longitude, or elevation associated with the mobile device, as shown in FIG. 1A. As such, the system may receive information relating to a user's location, thereby enabling the system to evaluate whether this user location is consistent with an authorized user of the secure system (e.g., a mobile application for access to a bank account).

In some embodiments, the system may receive cellular network information, including metadata, associated with a user device. For example, cellular network metadata may include any data associated with network connections, such as mobile or cellular network data. For example, cellular network metadata may include information relating to cell sites connected to a user's mobile device, including information relating to terrestrial transmitters communicating with the device. As an illustrative example, cellular network data may include location data associated with IP addresses associated with the mobile network connection. Additionally or alternatively, cellular network metadata may include information relating to terrestrial transmitters (e.g., cellular towers), such as signal strengths associated with various cellular towers in a given area. The system may utilize radiolocation methods to determine locations associated with cellular network metadata. For example, the system may utilize triangulation based on signal strengths and corresponding estimated distances to cellular towers to estimate a location of the user. In some embodiments, the system may request deactivation of WLAN or wireless network connectivity associated with a mobile device. As an illustrative example, the system may cause a notification message requesting deactivation of a Wi-Fi connection associated with a user device. By doing so, the system may cause the corresponding user device to connect to one or more cellular network terrestrial transmitters (e.g., cellular towers) in situations where Wi-Fi availability initially precludes such connectivity. As such, the system may determine user locations based on information apart from GPS or WLAN-associated data, thereby enabling cross-referencing and improved accuracy for determined locations associated with authentication tasks for users of secured systems, such as mobile applications for accessing bank accounts or cloud computing services.

In some embodiments, the system may determine a location associated with a user. A user may include an entity associated with a device, such as a user of a device through which a secure system (e.g., an online bank account or a cloud computing service) is accessible. A user may be associated with an authorized user of the secure system. For example, an authorized user may include a previously registered subscriber, customer, or client of the secure system. A user may claim to be associated with an authorized user of the secure system by, for example, submitting authentication credentials associated with the authorized user. The system may determine a likelihood (e.g., authentication probability) that the user of a user device is associated with or corresponds to the claimed user (e.g., an authorized user of the secure system), such as based on evaluating the location of the user device in the context of previous locations associated with the authorized user. As such, the system may evaluate the user based on information associated with the user device, thereby enabling authentication of the associated user.

In some embodiments, the system may determine a user location associated with a user device or user. For example, a user location may include pairs of geographical coordinates (e.g., where each pair includes a latitude and longitude value), physical addresses, or other geographical information associated with a mobile device (e.g., a determined elevation). A user location may include a single location; alternatively or additionally, a user location may indicate a geographical range (e.g., a region, area, or radius) in which a user device is likely located, such as indicating an uncertainty in the user's location. In some embodiments, a system may determine whether a user location corresponds to a present location associated with a user (e.g., a presence of the user). A present location may include a location at which a user exists. In some cases, such as where authentication is requested by a fraudulent or malicious entity, a user may not be in the same location as a user device that is submitting the user's credentials. In such cases, the user location as determined by the system (e.g., by measuring a user location associated with a user device) may not correspond to a present location of the user, who may be in a different geographical location. For example, the system may not be able to authenticate a presence of the user (e.g., an authorized user) at a determined location of the user device. By determining user locations based on user device connectivity and evaluating a likelihood that the user is present near the user location, the system may improve the accuracy of user authentication tasks, thereby improving system security.

In some embodiments, a user location may be determined based on pairs of average coordinates. As an illustrative example, a user location may be determined based on multiple pairs of geographical coordinates associated with different sources of information. The system may determine a first pair of coordinates (e.g., a first latitude and a first longitude) associated with GPS data. The system may determine a second pair of coordinates (e.g., a second latitude and a second longitude) associated with mobile network data. The system may determine a first coordinate for the user location based on an average of the first latitude and the second latitude (e.g., by determining an average latitude), and a second coordinate for the user location based on an average of the first longitude and the second longitude (e.g., by determining an average longitude). As such, the system may determine the user location based on a pair of these average coordinates (e.g., based on the average latitude and the average longitude). In some embodiments, the system may determine a centroid of two or more locations. For example, the system may average three or more pairs of latitudes and longitudes together to determine a single pair of geographical coordinates (e.g., an average latitude and an average longitude) based on Wi-Fi data, cellular network data, and GPS data. In some embodiments, a centroid of a two-dimensional or three-dimensional region (e.g., defining a cluster of locations) may be determined. By doing so, the system may combine multiple sources of data in order to determine a location, thereby leading to a more precise location, as a particular source may have errors, inaccuracy, or imprecision if used alone.

In some embodiments, a user location may be associated with a location classifier. A location classifier may include a characterization or classification of a location. For example, a location classifier may include an indication that a determined location is associated with an airport (e.g., based on a determination that a given location is within a radius of a known airport). Alternatively or additionally, a location classifier may indicate that a location is associated with a residential area, a business (e.g., a coffee shop or a restaurant), a school, or another type of location. In some embodiments, the system may determine a location classifier by looking up a determined user location in a location database to determine a particular business name or address associated with the location (e.g., a name of an airport associated with a given latitude and longitude) and classifying this business name accordingly. As such, the system may extract contextual information relating to a user's location. For example, a user device determined to be in the vicinity of an airport may indicate that the user is about to travel to another location and, as such, that the system may expect a subsequent location to correspond to another airport in another geographical region, for example. Thus, the system may improve the accuracy of user authentication by considering information characterizing determined user locations.

FIG. 1B shows illustrative data structure 120 of a user profile that specifies locations previously associated with a user based on wireless network, GPS, and cellular network data, in accordance with one or more embodiments. For example, the user profile may include location information 122, such as latitudes 128 and longitudes 130 associated with a user at various times indicated by timestamps 124. Furthermore, locations of location information 122 may be associated with measurement descriptors 126.

A user profile, such as that represented by data structure 120, may include information relating to previous locations associated with a given user (e.g., an authorized user of an online bank account web application or another secure system). For example, a user profile may include a geographical mapping (e.g., a graphical or data structure-based mapping) of previous user locations previously associated with the user (e.g., referred to as profile locations), such as previous user locations determined through WLAN user data, GPS user data, and cellular network user data. In some embodiments, user profiles may be stored within user profile databases, which may include multiple user profiles each associated with a corresponding authorized user of the secure system. As such, user profiles may provide information relating to the previous locations associated with users of secure systems, such as online bank account portals. By retrieving, storing, and/or considering such information, the system may better determine whether it is likely that a given user location is consistent with the user's previous behavior. For example, if previous location information associated with the user indicates that the user was recently at an airport, the system may determine that a subsequent determination that the user is in a different geographical region may not be inconsistent or indicative of malicious authentication attempts.

In some embodiments, a user location (or a profile location within a user profile) may be associated with one or more measurement descriptors. A measurement descriptor may include an indication of a source of information or data leading to determination of the user location. For example, a measurement descriptor may include an indication as to whether a user location is based on wireless network information (e.g., through an IP address or MAC address of a corresponding network router), GPS or location information (e.g., a latitude or longitude from satellite data), cellular network information (e.g., through triangulation of cellular towers connected to the user device), or a combination of various sources. For example, the system may determine whether a given user location or training location is wireless network- or WLAN-indicated, GPS-indicated, and/or cellular network-indicated. Because different sources of information may exhibit differing accuracy or reliability, or may indicate different circumstances, including an indication of the method used for user location determination may provide contextual data that leads to authentication of a given user. As an illustrative example, a user device connected to a wireless router and utilizing a virtual private network may cause determination of an inaccurate user location when compared to the same user device's GPS-indicated location. As such, the system may account for these variations in indicated location and determine the user device's location more reliably.

In some embodiments, the system may determine a time of determination for the user location, such as those indicated by timestamps 124. A time of determination may indicate a time associated with determination of a user location. For example, a time of determination may include a time associated with a GPS-indicated location, or a time at which triangulation using cellular network data generated an estimate of a user location. By including the time of determination for the user, the system may consider information relating to when a user device was in a given location, which may provide contextual information relating to whether a user location is consistent with the user's previous behavior. For example, a user location away from home late at night or early in the morning may indicate fraudulent or malicious activity in situations where a user has rarely previously left their house at night.

FIG. 1C shows illustrative schematic 140 of a geographical mapping of user locations previously associated with a user based on WLAN, GPS, and cellular network data, in accordance with one or more embodiments. For example, FIG. 1C includes map 142, including location indications 144, where the location indications indicate previous locations associated with the user. In some embodiments, the system may determine a geographical region 146 associated with clusters of previous user locations, indicating that a user may spend a significant amount of time at this region. For example, the system may define geographical bounds (e.g., as defined by a function of latitude and longitude) based on a high probability (e.g., as compared to a threshold probability) of the presence of the user within these bounds. By doing so, the system may better evaluate the authenticity of a user, such as in situations where the user device is determined to be likely outside these bounds.

In some embodiments, the system may determine a distance between locations. For example, the system may determine a distance between a first location of the user at a first time and a second location of the user at a second time, and determine a corresponding physical distance between the two locations. For example, the system may determine a distance in miles, kilometers, or other units of distance based on pairs of coordinates corresponding to each location. For example, the system may compare a distance between the first location and the second location to a threshold distance, before determining whether to authenticate the user device. In some embodiments, the system may determine to authenticate the user device if an elapsed period of time between the determination of the first location and the determination of the second location is greater than an elapsed threshold period of time. By doing so, the system may determine whether the user has strayed far from a first location in a short amount of time, which could be an indicator of a malicious entity attempting to access the secure system (e.g., a bank account) from a remote location.

In some embodiments, the system may determine a range of geographical locations associated with a user. For example, the system may extract a plurality of locations associated with the user from a user profile and determine a range of geographical locations based on these locations. For example, the system may define a geographical area based on any locations within a threshold radius from any location of the plurality of locations. In some embodiments, determining the range of geographical locations may include defining an area where a user is likely to be present based on locations within the user profile. For example, based on clustering of previous user locations (e.g., profile locations), the system may generate geographical region 146 defining an area of high probability of the presence of the user (e.g., as compared to a defined threshold probability). In response to determining that the user location is within this range, the system may determine to authenticate the user (or determine an authentication status accordingly), as the user location may be determined to be consistent with the user's previous behavior. As such, by defining geographical regions associated with a user's user profile, the system may improve the efficiency and accuracy of authentication of the user based on the user's or user device's location.

In some embodiments, the system may receive planned location indicators. Planned location indicators may include descriptions of travel plans for the user. In some embodiments, the travel plans may include a planned location of travel. For example, the user may communicate travel plans, including an itinerary of travel, such as ranges of dates (e.g., ranges of timestamps of travel) corresponding to travel to particular locations. The system may receive such travel plans and, accordingly, the system may determine that, upon determination of a user location in or near one of the planned locations of travel, the user may be authenticated, as the user location is consistent with the user's provided plans of travel. By doing so, the system may avoid false positive detections of security breaches where a user has traveled far from their habitual locations. As such, by receiving and processing planned location indicators, the system improves its flexibility and robustness to users' travel plans.

Figure 2:
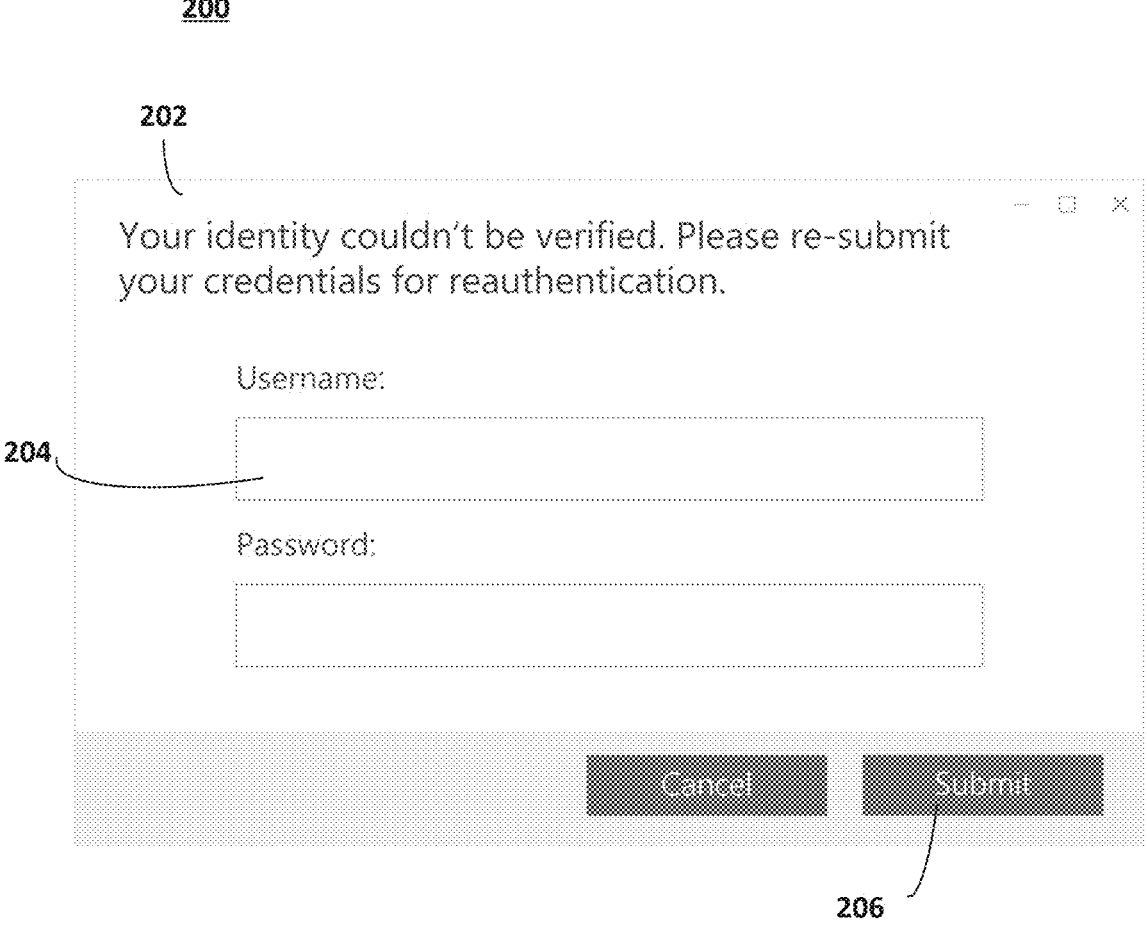
FIG. 2 shows an illustrative graphical user interface for a request for user reauthentication, in accordance with one or more embodiments.

FIG. 2 shows illustrative graphical user interface 200 for a request for user reauthentication, in accordance with one or more embodiments. For example, the system may utilize a determined user location and user profile corresponding to an authorized user of a secure system, such as a bank account web application, in order to determine whether to request further authentication of the user. In response to this determination, the system may cause a user interface associated with the user device to generate dialog box 202 and request one or more credentials, such as using username field 204, corresponding to the user, in order to further authenticate the user.

In order to determine whether to request reauthentication of the user (or otherwise), the system may utilize machine learning models to determine authentication probabilities. For example, the machine learning model may accept a user location (e.g., as determined by GPS data, wireless network data, or cellular network data) and a user profile (e.g., a plurality of locations previously associated with a user). Based on these inputs, the machine learning model may generate an authentication probability that indicates a likelihood that the user location indeed corresponds to a present location of the user. As an illustrative example, an authentication probability may include an indication of the likelihood that an authorized user is at the user device whose user location has been estimated or determined. The system may compare the authentication probability with a threshold probability prior to determining whether to request further authentication of the user. As an illustrative example, if the authentication probability is determined to be lower than the threshold probability, the system may request reauthentication of the user, as the system may determine that there is a large enough likelihood that an authorized user associated with the user account is not present near the mobile device based on the mobile device's location. The machine learning model may be trained based on other user profiles corresponding to other users (e.g., trained on training profiles) in order to determine this likelihood. In some embodiments, the machine learning model may include a classification model, such as an artificial neural network, which classifies users as likely authenticated or likely not authenticated, based on the user's current indicated location and/or profile locations. By generating authentication probabilities based on the user's location, the system may supplement other authentication information (e.g., provided passwords, usernames, or other authentication challenges) with a user location determined through multiple sources (e.g., GPS, mobile network, and/or WLAN data), thereby improving the accuracy and security of authentication tasks for secure systems, such as online or web application-based bank account systems.

In some embodiments, the system may receive or retrieve training profiles for training the machine learning model. For example, training profiles may include a plurality of user profiles associated with multiple users of the secure system (e.g., other customers of an online banking service). The plurality of user profiles may include a corresponding plurality of locations associated with the training profiles, as well as corresponding authentication indicators for each location. An authentication indicator may include whether a given location associated with the corresponding user is associated with the presence of this user—for example, an authentication indicator may include a marker as to whether the determined previous location of the corresponding user was found to be associated with a malicious entity, or whether authentication of the corresponding user at that location was successful. In some embodiments, the plurality of locations corresponding to each user may include corresponding training timestamps, indicating respective times associated with determination of the respective locations. As such, the system may learn behaviors or locations that are likely associated with malicious behavior (e.g., fraudulent authentication attempts) in contrast to common user behavior. Thus, by training the machine learning model using such data, the system may improve the accuracy of predictions of authentication probabilities associated with the first user.

Based on generating the authentication probabilities, the system may generate authentication messages for the first user. For example, the system may generate an authentication message that indicates that the user must be reauthenticated for continuing access to a corresponding online bank account. The system may generate this message using dialog box 202, for example, and may generate this message in response to determining that the authentication probability is lower than the threshold probability. In some embodiments, the authentication message may include a request transmitted to a server to cause further reauthentication of the user (e.g., through a user interface requesting further user credentials). User credentials may include authentication tokens or indicators. For example, user credentials may include usernames, passwords, biometric information (e.g., images of faces, bodies, or indications of fingerprints), completely automated public Turing tests to tell computers and humans apart (CAPTCHAs), or other information that may aid in confirming the identity of a user. In some embodiments, the system may subsequently compare any provided user credentials (e.g., once the user submits the user credentials using control 206) with known credentials. Known credentials may include user credentials provided to the system upon registration of the authorized user, such as passwords or usernames determined by the user upon initializing the online bank account. Based on whether the known credentials match the provided user credentials, the system may determine a validation status for the user. The validation status may indicate whether the user's authentication attempt was successful. By generating a validation status, the system may subsequently determine whether the user location is indeed associated with the presence of the user (e.g., based on correctly provided user credentials); in response to this determination, the system may learn the user's travel habits further by adding the user location to the user's user profile, thereby improving accuracy of subsequent authentication tasks.

Alternatively or additionally, the authentication message may be transmitted directly to the user through a user interface, for example. As such, even in situations where the system determines a poor likelihood that the user is present at the determined location of the user device, the system may give the user a chance to prove their authentication status by providing credentials. In contrast, in situations where the authentication probability is determined to be higher than (or equal to, for example) the threshold probability, the system may generate an authentication message that the user may not require immediate reauthentication for continued access to the online bank account, as it is likely that the user is still associated with the mobile device. Thus, the system may improve user experience while maintaining the security of the given secure system.

Figure 3:
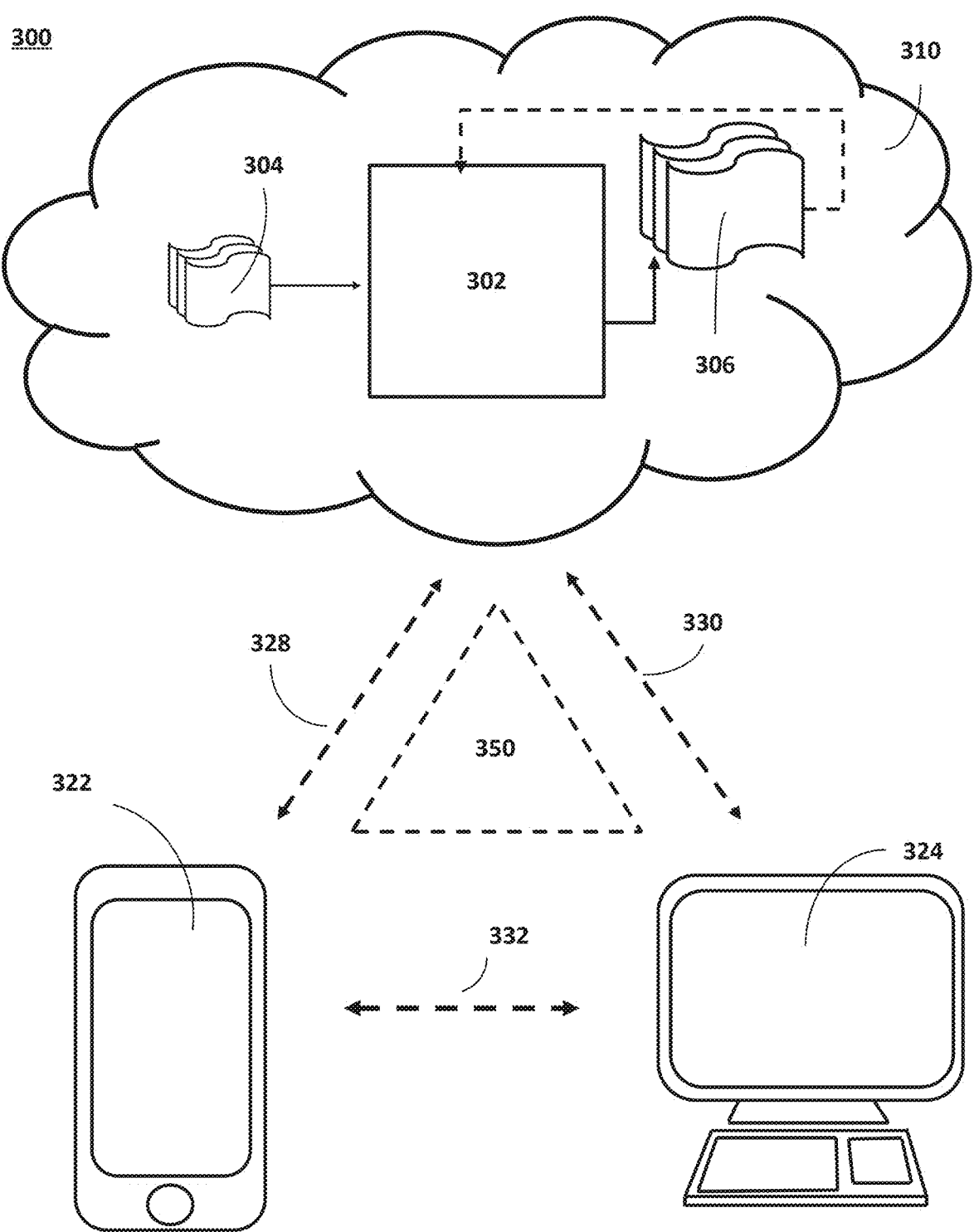
FIG. 3 shows illustrative components for a system used to authenticate users based on WLAN, GPS, and cellular network information, in accordance with one or more embodiments.

FIG. 3 shows illustrative components for a system used to authenticate users based on WLAN, GPS, and cellular network information, in accordance with one or more embodiments. For example, FIG. 3 may show illustrative components for authenticating users of online bank accounts based on user device location information. As shown in FIG. 3, system 300 may include mobile device 322 (or, e.g., a user device) and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include information or databases relating to wireless networks, GPS, or mobile networks. Additionally or alternatively, cloud components 310 may include information relating to users and past user locations, including user profile databases or information relating to user credentials (e.g., passwords or usernames). For example, cloud components 310 may access information relating to MAC addresses, IP addresses, or GPS satellites to aid in determination of users' locations.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., to predict an authentication probability relating to a user device, which may indicate a likelihood of user presence at a determined user location).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., to classify whether a user likely corresponds to an authorized user of a given secure system).

In some embodiments, the model (e.g., model 302) may automatically perform actions based on outputs 306. In some embodiments, the model (e.g., model 302) may not perform any actions. The output of the model (e.g., model

302) may be used to determine whether to authenticate a user (e.g., or whether to request reauthentication of the user) based on an authentication probability.

System 300 also includes application programming interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

FIG. 4 shows a flowchart of the steps involved in determining whether to request reauthentication of a user based on the user's location indicated by WLAN, GPS, or cellular network information, in accordance with one or more embodiments. For example, the system may use process 400 (e.g., as implemented on one or more system components described above) in order to authenticate users of secure systems, such as online bank accounts, based on location information associated with a user's mobile device.

At 402, process 400 (e.g., using one or more components described above) enables the system to transmit a request for network and location information (e.g., GPS information). For example, the system may transmit a first request to a user device (e.g., a mobile device) associated with a user at a first time, the first request comprising a request for network information and GPS information associated with the user. As an illustrative example, the system may request information from a mobile device regarding its connectivity. If the mobile device is connected to a network, such as a WLAN or Wi-Fi, the system may request information relating to this connection. Alternatively or additionally, if the mobile device is GPS-enabled, the system may request information relating to the mobile device's GPS connection, such as information relating to information transmitted to the device from corresponding satellites. By requesting such information, the system may request data that may be useful in determining a location for the mobile device, thereby aiding in authentication of the user operating the device.

At 404, process 400 (e.g., using one or more components described above) enables the system to receive wireless network configuration metadata and location data. For example, the system may receive, from the mobile device, wireless network configuration metadata and location data based on the first request. As an illustrative example, the system may receive information requested from the mobile device, such as connectivity metadata associated with WLAN or Wi-Fi connections, or location data. Such connectivity metadata may include IP addresses, signal strengths, MAC addresses, ISP identifiers, longitudes and latitudes associated with GPS data, or elevation. By receiving such information, the system may acquire enough information to estimate a location for the user device (e.g., the mobile device) based on such connectivity information.

At 406, process 400 (e.g., using one or more components described above) enables the system to transmit a second request for cellular network information. For example, the system may transmit a second request to the mobile device, the second request requesting cellular network information by deactivation of wireless network connectivity. As an illustrative example, the system may generate a notification on a user device (e.g., a mobile device) associated with the user that requests that the user deactivate Wi-Fi or WLAN connectivity temporarily, such that the mobile device switches to a connection with a cellular network. By requesting such a change, the system enables the mobile device to provide information relating to a cellular connection, which may provide further information (e.g., location-related information) that may enable the system to more effectively authenticate the user, such as to provide access for the user to a user account.

At 408, process 400 (e.g., using one or more components described above) enables the system to receive cellular network metadata from the mobile device. For example, based on the deactivation of the wireless network connectivity, the system may receive cellular network metadata from the mobile device. As an illustrative example, the system may receive information relating to a user device's connection with a cellular network, such as signal strengths of cellular network signals from cellular towers. For example, the system may receive, obtain, or determine latitudes and longitudes of cellular towers to which the mobile device is connected. By doing so, the system may obtain enough information to determine a location for the user device using cellular network data. By doing so, the system may receive location-based information about the user from various sources, thereby improving the accuracy of location data.

At 410, process 400 (e.g., using one or more components described above) enables the system to determine a user location. For example, the system may determine a first user location based on the wireless network configuration metadata, the location data, and the cellular network metadata. As an illustrative example, the system may utilize IP address or MAC address information from a WLAN connected to a user device and determine a location based on this wireless network information. The system may determine an estimated location for the user based on cellular network information, such as through triangulation using multiple cellular network signals from various cellular towers. The system may determine a latitude or longitude based on a GPS receiver (e.g., through signals sent by multiple GPS satellites). By combining such information, the system may estimate a user location based on various sources of location information, thereby improving the quality of an estimate of the user location. Furthermore, receiving multiple sources of location information for a user's mobile device (e.g., a user device) enables the system to mitigate situations where a malicious entity may attempt to cloak a mobile device's location using a subset of such sources of location information—for example, a malicious entity may hack into a user device to alter GPS information indicating the user's location. However, using cellular network or Wi-Fi information, in addition to the GPS information, enables the system to identify any discrepancies in mobile device-indicated locations, thereby improving the accuracy of authentication of users, such as for banking customers attempting to access their online bank accounts.

In some embodiments, the system may determine three pairs of geographical coordinates corresponding to different sources of location information and combine this information using an average of the pairs of geographical coordinates. For example, the system may determine a wireless network-indicated location based on the wireless network configuration metadata, wherein the wireless network-indicated location comprises a first pair of geographical coordinates. The system may determine a GPS-indicated location based on the location data, wherein the GPS-indicated location comprises a second pair of geographical coordinates. The system may determine a cellular network-indicated location based on the cellular network user data, wherein the cellular network-indicated location comprises a third pair of geographical coordinates. The system may determine the first user location, wherein the first user location comprises a pair of average coordinates, and wherein the pair of average coordinates indicates a centroid location of coordinates associated with the first pair, the second pair, and the third pair. As an illustrative example, the system may utilize the received metadata or data from the mobile device in order to determine individual locations corresponding to each location measurement or data source. The system may average the coordinates corresponding to these locations together in order to determine a pair of average coordinates (e.g., an average latitude and an average longitude). By doing so, the system may combine multiple sources of location data to improve the accuracy of location determination for the user or the mobile device.

In some embodiments, the system may utilize only a subset of these determined locations in order to estimate the user location. For example, the system may determine a wireless network-indicated location based on the wireless network configuration metadata, wherein the wireless network-indicated location comprises a first pair of geographical coordinates. The system may determine a GPS-indicated location based on the location data, wherein the GPS-indicated location comprises a second pair of geographical coordinates. The system may determine a cellular network-indicated location based on the cellular network user data, wherein the cellular network-indicated location comprises a third pair of geographical coordinates. The system may determine an average location of two measurements, wherein the average location of the two measurements indicates a pair of average geographical coordinates, wherein the pair of average geographical coordinates is associated with an average of any two of the first pair of geographical coordinates, the second pair of geographical coordinates, or the third pair of geographical coordinates, and wherein any one pair of geographical coordinates of the first pair, the second pair, or the third pair indicates a location greater than a threshold distance from the average location of the two measurements. The system may determine the first user location based on the average location of the two measurements. As an illustrative example, one of (or a subset of) the locations determined based on GPS, WLAN, or cellular network data may be inconsistent with the other locations. For example, a GPS-indicated location (e.g., a latitude and longitude associated with the mobile device's GPS receiver) may indicate a location far away from Wi-Fi- or cellular network-indicated locations, as the user may be in a location with a poor GPS signal. As such, the system may determine to generate the user location using an average of only a subset of determined locations, thereby improving the accuracy of location determination.

At 412, process 400 (e.g., using one or more components described above) enables the system to retrieve a user profile. For example, the system may retrieve a user profile from a user profile database, wherein the user profile comprises a geographical mapping of user locations previously associated with the user based on wireless network user data, location user data, and cellular network user data. As an illustrative example, the system may retrieve a list of locations previously determined to be associated with the user (e.g., associated with previous receipt of Wi-Fi, GPS, or cellular network metadata). In some cases, the user profile may include a geographical mapping of such locations, including regions or clusters of indicated locations. By retrieving information relating to previous locations of the user, the system may leverage the user's past behavior to contextualize the determined user location, such as to identify whether the determined user location is consistent with the user, or whether it is indicative of another entity's behavior instead.

In some embodiments, the system may add information relating to the user's future travel plans to the user profile, such that these plans are accounted for during user authentication. For example, the system may receive a planned location indicator from the mobile device, wherein the planned location indicator includes a description of travel plans for the user and a corresponding planned location of travel. Based on the planned location indicator, the system may generate a set of geographical coordinates and a corresponding range of timestamps within the user profile to enable authentication of the user at the corresponding planned location of travel. As an illustrative example, a user may submit travel plans to the system, including ranges of times during which the user expects to be at corresponding locations or regions. By doing so, the system may account for situations where the user is traveling outside of the user's habitual region or environment, such that the user may be authenticated even in such circumstances. Thus, by receiving planned location indicators and adding this information to the user profile, the system may improve its flexibility in determining to authenticate users based on the user's location.

At 414, process 400 (e.g., using one or more components described above) enables the system to provide the user location and the user profile to a machine learning model. As an illustrative example, the system may provide coordinates, addresses, or other location information associated with the user location (e.g., as determined at 412), as well as the user profile (e.g., a geographical mapping of the user's previous travel behavior), to an artificial neural network (e.g., a classification model). The model may be configured to output information relating to authentication of the user, such as an authentication probability. By doing so, the system may combine information regarding a user's previous location data, as well as an indication of the user device's indicated user location, in order to authenticate the user for access to secure systems, such as for online banking web applications associated with a user account.

At 416, process 400 (e.g., using one or more components described above) enables the system to generate an authentication probability based on the machine learning model. For example, based on providing the first user location and the user profile to the machine learning model, the system may generate an authentication probability, wherein the authentication probability indicates a likelihood that the first user location corresponds to a present location of the user. The system may output a probability associated with whether the user location is consistent with previous locations associated with the user. As an illustrative example, the system may determine that, due to the user being at a location far from the area around the user's habitual home, there is a relatively low probability that the user may be authenticated (e.g., that the user corresponds to an authorized user of the secure system, such as a banking system). As such, the system may evaluate whether a user device is being controlled by a malicious entity, thereby improving system security and ensuring that malicious entities are not given control of secure systems.

At 418, process 400 (e.g., using one or more components described above) enables the system to transmit an authentication message based on comparing the authentication probability to a threshold value. For example, based on determining that the authentication probability is less than a threshold authentication probability, the system may transmit an authentication message to a server, wherein the authentication message indicates a reauthentication request for the user. As an illustrative example, the system may cause a user interface associated with the mobile device to require the user to submit user credentials (e.g., passwords, usernames, or other indicators of the user's identity), based on determining that the authentication probability is lower than a threshold. By doing so, the system may ensure that, in situations where it is possible that the user is not indeed an authorized user of the secure system (e.g., an online banking account), the user must provide additional information prior to being able to access the system. Additionally or alternatively, the system may determine that the authentication probability is above the threshold probability and, in response, determine that a reauthentication request is not required (e.g., determine to provide access of the secure system to the user without further submission of some or any user credentials). As such, the system may improve user experience for accessing, for example, online bank accounts, while maintaining system security.

In some embodiments, the system may train the model using training profiles corresponding to other users. For example, the system may retrieve, from the user profile database, a plurality of training profiles, wherein each training profile of the plurality of training profiles is associated with a corresponding user of a plurality of users, wherein each training profile of the plurality of training profiles includes a corresponding plurality of locations, and wherein a respective location of the corresponding plurality of locations is associated with a respective authentication indicator indicating whether the respective location is associated with a presence of the corresponding user. Based on providing the plurality of training profiles to the machine learning model, the system may train the machine learning model to output authentication probabilities based on input user profiles and input user locations, wherein the authentication probabilities indicate likelihoods of present locations of users being associated with the input user locations. For example, the system may leverage previous locations determined to be associated with other users, as well as indicators as to whether these locations were associated with malicious activity (e.g., using authentication indicators) in order to train the model to detect situations where user behavior may be indicative of malicious or fraudulent activity. By doing so, the system may leverage information across a variety of users and corresponding travel habits in order to determine whether a user requires further authentication, thereby improving the accuracy of fraud mitigation and protecting secure systems, such as bank accounts, from unauthorized access.

In some embodiments, the system may leverage timestamp information that is associated with user locations of training profiles in order to train the machine learning model. For example, the system may determine a corresponding plurality of training timestamps associated with the corresponding plurality of locations for each training profile, wherein each respective timestamp of the corresponding plurality of training timestamps indicates a time associated with determination of the respective location of the corresponding plurality of locations. Based on providing the corresponding plurality of training timestamps and the plurality of training profiles to the machine learning model, the system may train the machine learning model to output the authentication probabilities based on the input user profiles, the input user locations, and timestamps associated with the input user locations. For example, the system may leverage timestamps associated with locations that were visited by other users of the secure system (e.g., other banking customers), and utilize this information to train the machine learning model to identify unauthorized behavior. Because a user's habits may be time-dependent (e.g., a user may be more likely to be at a certain place, such as home, during the night), time information may improve the ability of the system to determine whether a user's location may be indicative of unauthorized access to the system. As such, by training the machine learning model using timestamp information, the system may improve the accuracy of the machine learning model by enabling the model to account for other factors, such as times at which users visit locations.

In some embodiments, the system may update or determine the user location based on information that includes a time at which the user location was measured or determined. For example, the system may determine a first timestamp associated with a first time of determination of the first user location, based on providing the first timestamp to the machine learning model. Based on providing the first timestamp to the machine learning model, the system may generate an updated authentication probability based on the user profile, the first user location, and the first timestamp. For example, the system may account for a time at which the user location was determined in determining whether to request reauthentication from the user. As an illustrative example, a user may be unaccustomed to being outside of their home at night. In contrast, the system may determine that the first timestamp and the first user location indicate that the mobile device is outside of the home at night. As such, the system may determine or update the authentication probability based on this time, as the time and user location may indicate that the mobile device may be controlled by a malicious entity.

In some embodiments, the system may consider information relating to how user locations were determined for training the machine learning model. For example, the system may determine a corresponding plurality of measurement descriptors for each corresponding plurality of locations for each training profile, wherein each measurement descriptor of the corresponding plurality of measurement descriptors indicates that the respective location was determined using a corresponding combination of wireless network information, location information, or cellular network information. Based on providing each corresponding plurality of measurement descriptors and the plurality of training profiles to the machine learning model, the system may train the machine learning model to output the authentication probabilities based on the input user profiles, the input user locations, and measurement descriptors. As an illustrative example, the system may indicate a method by which locations were determined for each training profile. For example, the system may indicate whether locations were determined using GPS data, cellular network metadata, or Wi-Fi metadata. For example, certain methods of location measurement may be less accurate or more imprecise than others; as such, by including information relating to the measurement method of each user location (or whether a combination was used), the system may account for these differences in accuracy or precision, thereby improving the accuracy of authentication decisions (e.g., the accuracy of predicted authentication probabilities generated by the machine learning model).

In some embodiments, the system may generate or update authentication probabilities based on how the first user location was measured. For example, the system may provide a first measurement descriptor to the machine learning model, wherein the first measurement descriptor indicates that the first user location was determined using a first combination of wireless network information, location information, and cellular network information. Based on providing the first measurement descriptor to the machine learning model, the system may generate an updated authentication probability based on the user profile, the first user location, and the first measurement descriptor. As an illustrative example, the system may incorporate information relating to how the user location was determined (e.g., whether the user location was determined using Wi-Fi-, GPS-, or cellular network-indicated locations, or a combination or subset thereof) into determination of the authentication probability. As such, the system may account for varying reliability of methods of measuring mobile device location and update the authentication probability accordingly. By doing so, in situations where a very accurate method for a given circumstance is used (e.g., GPS in an open, rural area without vertical obstructions), the system may update or tune the authentication probability, thereby improving system security by improving the evaluation of whether the user is an authorized user of the system, or whether a malicious entity may be controlling the mobile device and/or attempting to access the system in an unauthorized manner.

In some embodiments, the system may further utilize information relating to how the user's location has been previously measured (e.g., through the user profile) in order to determine the authentication probability. For example, the system may extract, from the user profile, a plurality of profile locations associated with the user, wherein each profile location of the plurality of profile locations corresponds to a set of geographical coordinates characterizing a corresponding previous location of the user. The system may determine a plurality of measurement descriptors, wherein each corresponding measurement descriptor of the plurality of measurement descriptors indicates that a corresponding profile location of the plurality of profile locations was determined using a corresponding combination of wireless network information, location information, and cellular network information. Based on providing the plurality of profile locations, the plurality of measurement descriptors, and the first user location to the machine learning model, the system may generate the authentication probability. For example, the system may leverage personal information relating to reliability of measurement methods associated with the user's particular mobile device in order to update the authentication probability. As an illustrative example, a user may have a faulty GPS receiver, which may systematically produce inaccurate user results. The system may store GPS-indicated locations within the user profile, which may reflect that the GPS-indicated locations are regularly inconsistent with cellular network- or Wi-Fi-indicated locations. As such, the system may update the authentication probability to weigh non-GPS-indicated user locations more heavily than other determined user locations, thereby improving the accuracy of user authentication.

In some embodiments, the system may classify locations of the training profiles based on what type of location they are, in order to improve the machine learning model's ability to evaluate whether a user's location is indicative of malicious activity. For example, the system may determine a corresponding plurality of location classifiers for each corresponding plurality of locations for each training profile, wherein each location classifier of the corresponding plurality of location classifiers indicates a respective classification of the respective location based on a likelihood that the corresponding user will move to any previously unvisited location based on the respective location. Based on providing each corresponding plurality of location classifiers and the plurality of training profiles to the machine learning model, the system may train the machine learning model to output the authentication probabilities based on the input user profiles and the input user locations. As an illustrative example, the system may determine whether locations of the training profiles correspond to airports, coffee shops, restaurants, or hotels (e.g., by looking up the locations on a location database) and train the model according to these classifications. By doing so, the system may learn whether certain locations may be more indicative of future travel (e.g., hotels or airports) as compared to other locations (e.g., residential locations, such as homes or apartments). As such, the system improves the accuracy of the machine learning model's determination of authentication probabilities.

In some embodiments, the system may update or generate authentication probabilities based on a classification of the user location. For example, the system may determine, using a location database, a first location classifier associated with the first user location, wherein the first location classifier indicates a classification of the first user location indicating that the first user location is associated with travel to any previously unvisited location. The system may provide the first location classifier to the machine learning model. Based on providing the first location classifier to the machine learning model, the system may generate an updated authentication probability based on the user profile, the first user location, and the first location classifier. As an illustrative example, a user location may be indicative of the user being at an airport or a hotel. The system may account for an increase in the probability of the user being at a different location subsequently and update the current or subsequently determined authentication probabilities accordingly. By doing so, the system may improve the accuracy of user authentication based on whether the user is likely to be on vacation, traveling, or otherwise at a location indicative of a change in habit.

In some embodiments, the system may transmit the reauthentication request such that user credentials are requested or received from the mobile device and update the user profile accordingly. For example, based on the reauthentication request, the system may receive, from the mobile device, user credentials associated with the user. Based on comparing the user credentials with known credentials in a user database, the system may determine a validation status for the use. Based on the validation status, the system may update the user profile to include the first user location. As an illustrative example, the user may submit a password and username in response to the reauthentication request. Upon determining that the submitted password and username (e.g., user credentials) match the user's known password and username (e.g., as in a user database, or determined upon registration of the user), the system may generate a validation status, which may indicate whether the user has successfully verified their identity or control of the mobile device. Based on this validation status, the system may update the user profile to include the first user location, as the user has been determined to indeed correspond to an authorized user of the secure system (e.g., an online bank account). By doing so, the system may prevent the user from needing to resubmit user credentials in the future where the user is in a similar situation or region, thereby improving the efficiency of access to secure systems and improving user experience, while maintaining system security by requiring reauthentication of the user in other situations where the user's identity cannot be verified.

In some embodiments, the system may confirm authentication of the user if the user has not moved away from a previous location within a certain period of time. For example, the system may determine a first timestamp associated with a first time of determination of the first user location. The system may determine a second timestamp at a second time, wherein an elapsed period of time between the first time and the second time is greater than a threshold elapsed period of time. At the second time, the system may transmit a third request to the mobile device, the third request requesting updated wireless network configuration information, updated location data, and updated cellular network user data. The system may receive, from the mobile device, updated wireless network configuration metadata, updated location information, and updated cellular network user information. The system may determine a second user location based on the updated wireless network configuration metadata, the updated location information, and the updated cellular network user information. The system may determine a distance between the first user location and the second user location. Based on determining that the distance is less than a threshold distance, the system may transmit a message confirming authentication of the user credentials. As an illustrative example, the system may not require reauthentication of the user if the user's current user location is not substantially different from the user's recent previous location, as the authentication probability of the user may be higher than otherwise, as the user's mobile device is still in a similar region. As such, the system may reduce the requirement for a user to submit consecutive reauthentication requests over short periods of time if the user location indicates that the user has not significantly moved. By doing so, the system improves the efficiency of a user accessing, for example, an online bank account, improving user experience while continuing to enable the system to thwart unauthorized attempts to access the bank account.

In some embodiments, the system may determine that the user is not within a range of locations associated with the user (e.g., locations listed within the user profile). Based on this determination, the system may determine to request reauthentication of the user prior to providing access to, for example, a corresponding bank account for the user. For example, the system may determine, based on the user profile, a plurality of locations associated with the user. The system may determine a range of geographical locations, wherein each geographical location in the range of geographical locations is within a threshold distance of any location of the plurality of locations; The system may determine that the first user location is not associated with any geographical location in the range of geographical locations. Based on determining that the first user location is not associated with any geographical location in the range of geographical locations, the system may transmit the authentication message indicating the reauthentication request. For example, the system may determine that the user location is relatively far from any previous locations visited by the user, as indicated by the user profile. Based on this determination, the system may transmit the reauthentication message (e.g., including a request for user credentials for confirmation of the user's identity). By doing so, the system may ensure that unauthorized entities are not attempting to access an authorized user's bank account, for example, from a remote location, thereby improving the security of the user's bank account and underlying secure system.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: transmitting a first request to a mobile device associated with a user at a first time, the first request comprising a request for network information and GPS information associated with the user; receiving, from the mobile device, WLAN configuration metadata and GPS data based on the first request; in response to receiving the WLAN configuration metadata, transmitting a second request to the mobile device, the second request requesting cellular network information by deactivation of WLAN connectivity; based on the deactivation of the WLAN connectivity, receiving cellular network metadata from the mobile device; determining a first user location based on the WLAN configuration metadata, the GPS data, and the cellular network metadata; retrieving a user profile from a user profile database, wherein the user profile comprises a geographical mapping of user locations previously associated with the user based on WLAN user data, GPS user data, and cellular network user data; based on providing the first user location, the first time, and the user profile to a machine learning model, generating an authentication probability, wherein the authentication probability indicates a likelihood that the first user location corresponds to a present location of the user; and based on determining that the authentication probability is less than a threshold authentication probability, transmitting an authentication message to a server, wherein the authentication message indicates a reauthentication request for the user.

2. A method comprising: transmitting a first request to a mobile device associated with a user, the first request comprising a request for network information and location information associated with the user; receiving, from the mobile device, wireless network configuration metadata and location data based on the first request; transmitting a second request to the mobile device, the second request requesting cellular network information by deactivation of wireless network connectivity; based on the deactivation of the wireless network connectivity, receiving cellular network metadata from the mobile device; determining a first user location based on the wireless network configuration metadata, the location data, and the cellular network metadata; retrieving a user profile from a user profile database, wherein the user profile comprises a geographical mapping of user locations previously associated with the user based on wireless network user data, location user data, and cellular network user data; providing the first user location and the user profile to a machine learning model; based on providing the first user location and the user profile to the machine learning model, generating an authentication probability, wherein the authentication probability indicates a likelihood that the first user location corresponds to a present location of the user; and based on determining that the authentication probability is less than a threshold authentication probability, transmitting an authentication message to a server, wherein the authentication message indicates a reauthentication request for the user.

3. A method comprising: transmitting a first request to a mobile device associated with a user, the first request comprising a request for network information and location information associated with the user; receiving, from the mobile device, wireless network configuration metadata and location data based on the first request; transmitting a second request to the mobile device, the second request requesting cellular network information; based on the second request, receiving cellular network metadata from the mobile device; determining a first user location based on the wireless network configuration metadata, the location data, and the cellular network metadata; retrieving a user profile from a user profile database, wherein the user profile comprises a geographical mapping of user locations previously associated with the user based on wireless network user data, location user data, and cellular network user data; providing the first user location and the user profile to a machine learning model; based on providing the first user location and the user profile to the machine learning model, generating an authentication probability, wherein the authentication probability indicates a likelihood that the first user location corresponds to a present location of the user; and based on determining that the authentication probability is less than a threshold authentication probability, transmitting an authentication message to a server, wherein the authentication message indicates a reauthentication request for the user.

4. The method of any one of the preceding embodiments, further comprising: retrieving, from the user profile database, a plurality of training profiles, wherein each training profile of the plurality of training profiles is associated with a corresponding user of a plurality of users, wherein each training profile of the plurality of training profiles includes a corresponding plurality of locations, and wherein a respective location of the corresponding plurality of locations is associated with a respective authentication indicator indicating whether the respective location is associated with a presence of the corresponding user; and based on providing the plurality of training profiles to the machine learning model, training the machine learning model to output authentication probabilities based on input user profiles and input user locations, wherein the authentication probabilities indicate likelihoods of present locations of users being associated with the input user locations.

5. The method of any one of the preceding embodiments, wherein training the machine learning model comprises: determining a corresponding plurality of training timestamps associated with the corresponding plurality of locations for each training profile, wherein each respective timestamp of the corresponding plurality of training timestamps indicates a time associated with determination of the respective location of the corresponding plurality of locations; and based on providing the corresponding plurality of training timestamps and the plurality of training profiles to the machine learning model, training the machine learning model to output the authentication probabilities based on the input user profiles, the input user locations, and timestamps associated with the input user locations.

6. The method of any one of the preceding embodiments, further comprising: determining a first timestamp associated with a first time of determination of the first user location; providing the first timestamp to the machine learning model; and based on providing the first timestamp to the machine learning model, generating an updated authentication probability based on the user profile, the first user location, and the first timestamp.

7. The method of any one of the preceding embodiments, wherein training the machine learning model comprises: determining a corresponding plurality of measurement descriptors for each corresponding plurality of locations for each training profile, wherein each measurement descriptor of the corresponding plurality of measurement descriptors indicates that the respective location was determined using a corresponding combination of wireless network information, location information, or cellular network information; and based on providing each corresponding plurality of measurement descriptors and the plurality of training profiles to the machine learning model, training the machine learning model to output the authentication probabilities based on the input user profiles, the input user locations, and measurement descriptors.

8. The method of any one of the preceding embodiments, further comprising: providing a first measurement descriptor to the machine learning model, wherein the first measurement descriptor indicates that the first user location was determined using a first combination of wireless network information, location information, and cellular network information; and based on providing the first measurement descriptor to the machine learning model, generating an updated authentication probability based on the user profile, the first user location, and the first measurement descriptor.

9. The method of any one of the preceding embodiments, further comprising: extracting, from the user profile, a plurality of profile locations associated with the user, wherein each profile location of the plurality of profile locations corresponds to a set of geographical coordinates characterizing a corresponding previous location of the user; determining a plurality of measurement descriptors, wherein each corresponding measurement descriptor of the plurality of measurement descriptors indicates that a corresponding profile location of the plurality of profile locations was determined using a corresponding combination of wireless network information, location information, and cellular network information; and based on providing the plurality of profile locations, the plurality of measurement descriptors, and the first user location to the machine learning model, generating the authentication probability.

10. The method of any one of the preceding embodiments, wherein training the machine learning model comprises: determining a corresponding plurality of location classifiers for each corresponding plurality of locations for each training profile, wherein each location classifier of the corresponding plurality of location classifiers indicates a respective classification of the respective location based on a likelihood that the corresponding user will move to any previously unvisited location based on the respective location; and based on providing each corresponding plurality of location classifiers and the plurality of training profiles to the machine learning model, training the machine learning model to output the authentication probabilities based on the input user profiles and the input user locations.

11. The method of any one of the preceding embodiments, further comprising: determining, using a location database, a first location classifier associated with the first user location, wherein the first location classifier indicates a classification of the first user location indicating that the first user location is associated with travel to any previously unvisited location; providing the first location classifier to the machine learning model; and based on providing the first location classifier to the machine learning model, generating an updated authentication probability based on the user profile, the first user location, and the first location classifier.

12. The method of any one of the preceding embodiments, further comprising: based on the reauthentication request, receiving, from the mobile device, user credentials associated with the user; based on comparing the user credentials with known credentials in a user database, determining a validation status for the user;

and based on the validation status, updating the user profile to include the first user location.

13. The method of any one of the preceding embodiments, further comprising: determining a first timestamp associated with a first time of determination of the first user location; determining a second timestamp at a second time, wherein an elapsed period of time between the first time and the second time is greater than a threshold elapsed period of time; at the second time, transmitting a third request to the mobile device, the third request requesting updated wireless network configuration information, updated location data, and updated cellular network user data; receiving, from the mobile device, updated wireless network configuration metadata, updated location information, and updated cellular network user information; determining a second user location based on the updated wireless network configuration metadata, the updated location information, and the updated cellular network user information; determining a distance between the first user location and the second user location; and based on determining that the distance is less than a threshold distance, transmitting a message confirming authentication of the user credentials.

14. The method of any one of the preceding embodiments, further comprising: determining, based on the user profile, a plurality of locations associated with the user; determining a range of geographical locations, wherein each geographical location in the range of geographical locations is within a threshold distance of any location of the plurality of locations; determining that the first user location is not associated with any geographical location in the range of geographical locations; and based on determining that the first user location is not associated with any geographical location in the range of geographical locations, transmitting the authentication message indicating the reauthentication request.

15. The method of any one of the preceding embodiments, wherein determining the first user location comprises: determining a wireless network-indicated location based on the wireless network configuration metadata, wherein the wireless network-indicated location comprises a first pair of geographical coordinates; determining a GPS-indicated location based on the location data, wherein the GPS-indicated location comprises a second pair of geographical coordinates; determining a cellular network-indicated location based on the cellular network user data, wherein the cellular network-indicated location comprises a third pair of geographical coordinates; and determining the first user location, wherein the first user location comprises a pair of average coordinates, and wherein the pair of average coordinates indicates a centroid location of coordinates associated with the first pair, the second pair, and the third pair.

16. The method of any one of the preceding embodiments, wherein determining the first user location comprises: determining a wireless network-indicated location based on the wireless network configuration metadata, wherein the wireless network-indicated location comprises a first pair of geographical coordinates; determining a GPS-indicated location based on the location data, wherein the GPS-indicated location comprises a second pair of geographical coordinates; determining a cellular network-indicated location based on the cellular network user data, wherein the cellular network-indicated location comprises a third pair of geographical coordinates; determining an average location of two measurements, wherein the average location of the two measurements indicates a pair of average geographical coordinates, wherein the pair of average geographical coordinates is associated with an average of any two of the first pair of geographical coordinates, the second pair of geographical coordinates, or the third pair of geographical coordinates, and wherein any one pair of geographical coordinates of the first pair, the second pair, or the third pair indicates a location greater than a threshold distance from the average location of the two measurements; and determining the first user location based on the average location of the two measurements.

17. The method of any one of the preceding embodiments, further comprising: receiving a planned location indicator from the mobile device, wherein the planned location indicator includes a description of travel plans for the user and a corresponding planned location of travel; and based on the planned location indicator, generating a set of geographical coordinates and a corresponding range of timestamps within the user profile to enable authentication of the user at the corresponding planned location of travel.

18. One or more non-transitory, computer-readable media storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

21. A system comprising cloud-based circuitry for performing any of embodiments 1-17.

What is claimed is:

1. A system for authenticating users associated with mobile devices based on wireless local area network (WLAN), global positioning system (GPS), and cellular network information, the system comprising:

one or more processors; and one or more non-transitory, computer-readable media storing instructions that, when executed by the one or more processors, cause operations comprising:

transmitting a first request to a mobile device associated with a user at a first time, the first request comprising a request for network information and GPS information associated with the user;

receiving, from the mobile device, WLAN configuration metadata and GPS data based on the first request;

in response to receiving the WLAN configuration metadata, transmitting a second request to the mobile device, the second request requesting cellular network information by deactivation of WLAN connectivity;

based on the deactivation of the WLAN connectivity, receiving cellular network metadata from the mobile device;

determining a first user location based on the WLAN configuration metadata, the GPS data, and the cellular network metadata;

retrieving a user profile from a user profile database, wherein the user profile comprises a geographical mapping of user locations previously associated with the user based on WLAN user data, GPS user data, and cellular network user data;

based on providing the first user location, the first time, and the user profile to a machine learning model, generating an authentication probability, wherein the authentication probability indicates a likelihood that the first user location corresponds to a present location of the user; and based on determining that the authentication probability is less than a threshold authentication probability, transmitting an authentication message to a server, wherein the authentication message indicates a reauthentication request for the user.

2. A method for authenticating users associated with mobile devices, comprising:

transmitting a first request to a mobile device associated with a user, the first request comprising a request for network information and location information associated with the user;

receiving, from the mobile device, wireless network configuration metadata and location data based on the first request;

transmitting a second request to the mobile device, the second request requesting cellular network information by deactivation of wireless network connectivity;

based on the deactivation of the wireless network connectivity, receiving cellular network metadata from the mobile device;

determining a first user location based on the wireless network configuration metadata, the location data, and the cellular network metadata;

retrieving a user profile from a user profile database, wherein the user profile comprises a geographical mapping of user locations previously associated with the user based on wireless network user data, location user data, and cellular network user data;

providing the first user location and the user profile to a machine learning model;

based on providing the first user location and the user profile to the machine learning model, generating an authentication probability, wherein the authentication probability indicates a likelihood that the first user location corresponds to a present location of the user; and based on determining that the authentication probability is less than a threshold authentication probability, transmitting an authentication message to a server, wherein the authentication message indicates a reauthentication request for the user.

3. The method of claim 2, further comprising:

retrieving, from the user profile database, a plurality of training profiles, wherein each training profile of the plurality of training profiles is associated with a corresponding user of a plurality of users, wherein each training profile of the plurality of training profiles includes a corresponding plurality of locations, and wherein a respective location of the corresponding plurality of locations is associated with a respective authentication indicator indicating whether the respective location is associated with a presence of the corresponding user; and based on providing the plurality of training profiles to the machine learning model, training the machine learning model to output authentication probabilities based on input user profiles and input user locations, wherein the authentication probabilities indicate likelihoods of present locations of users being associated with the input user locations.

4. The method of claim 3, wherein training the machine learning model comprises:

determining a corresponding plurality of training timestamps associated with the corresponding plurality of locations for each training profile, wherein each respective timestamp of the corresponding plurality of training timestamps indicates a time associated with determination of the respective location of the corresponding plurality of locations; and based on providing the corresponding plurality of training timestamps and the plurality of training profiles to the machine learning model, training the machine learning model to output the authentication probabilities based on the input user profiles, the input user locations, and timestamps associated with the input user locations.

5. The method of claim 4, further comprising:

determining a first timestamp associated with a first time of determination of the first user location;

providing the first timestamp to the machine learning model; and based on providing the first timestamp to the machine learning model, generating an updated authentication probability based on the user profile, the first user location, and the first timestamp.

6. The method of claim 3, wherein training the machine learning model comprises:

determining a corresponding plurality of measurement descriptors for each corresponding plurality of locations for each training profile, wherein each measurement descriptor of the corresponding plurality of measurement descriptors indicates that the respective location was determined using a corresponding combination of wireless network information, location information, or cellular network information; and based on providing each corresponding plurality of measurement descriptors and the plurality of training profiles to the machine learning model, training the machine learning model to output the authentication probabilities based on the input user profiles, the input user locations, and measurement descriptors.

7. The method of claim 6, further comprising:

providing a first measurement descriptor to the machine learning model, wherein the first measurement descriptor indicates that the first user location was determined using a first combination of wireless network information, location information, and cellular network information; and based on providing the first measurement descriptor to the machine learning model, generating an updated authentication probability based on the user profile, the first user location, and the first measurement descriptor.

8. The method of claim 3, further comprising:

extracting, from the user profile, a plurality of profile locations associated with the user, wherein each profile location of the plurality of profile locations corresponds to a set of geographical coordinates characterizing a corresponding previous location of the user;

determining a plurality of measurement descriptors, wherein each corresponding measurement descriptor of the plurality of measurement descriptors indicates that a corresponding profile location of the plurality of profile locations was determined using a corresponding combination of wireless network information, location information, and cellular network information; and based on providing the plurality of profile locations, the plurality of measurement descriptors, and the first user location to the machine learning model, generating the authentication probability.

9. The method of claim 3, wherein training the machine learning model comprises:

determining a corresponding plurality of location classifiers for each corresponding plurality of locations for each training profile, wherein each location classifier of the corresponding plurality of location classifiers indicates a respective classification of the respective location based on a likelihood that the corresponding user will move to any previously unvisited location based on the respective location; and based on providing each corresponding plurality of location classifiers and the plurality of training profiles to the machine learning model, training the machine learning model to output the authentication probabilities based on the input user profiles and the input user locations.

10. The method of claim 9, further comprising:

determining, using a location database, a first location classifier associated with the first user location, wherein the first location classifier indicates a classification of the first user location indicating that the first user location is associated with travel to any previously unvisited location;

providing the first location classifier to the machine learning model; and based on providing the first location classifier to the machine learning model, generating an updated authentication probability based on the user profile, the first user location, and the first location classifier.

11. The method of claim 2, further comprising:

based on the reauthentication request, receiving, from the mobile device, user credentials associated with the user;

based on comparing the user credentials with known credentials in a user database, determining a validation status for the user; and based on the validation status, updating the user profile to include the first user location.

12. The method of claim 11, further comprising:

determining a first timestamp associated with a first time of determination of the first user location;

determining a second timestamp at a second time, wherein an elapsed period of time between the first time and the second time is greater than a threshold elapsed period of time;

at the second time, transmitting a third request to the mobile device, the third request requesting updated wireless network configuration information, updated location data, and updated cellular network user data;

receiving, from the mobile device, updated wireless network configuration metadata, updated location information, and updated cellular network user information;

determining a second user location based on the updated wireless network configuration metadata, the updated location information, and the updated cellular network user information;

determining a distance between the first user location and the second user location; and based on determining that the distance is less than a threshold distance, transmitting a message confirming authentication of the user credentials.

13. The method of claim 2, further comprising:

determining, based on the user profile, a plurality of locations associated with the user;

determining a range of geographical locations, wherein each geographical location in the range of geographical locations is within a threshold distance of any location of the plurality of locations;

determining that the first user location is not associated with any geographical location in the range of geographical locations; and based on determining that the first user location is not associated with any geographical location in the range of geographical locations, transmitting the authentication message indicating the reauthentication request.

14. The method of claim 2, wherein determining the first user location comprises:

determining a wireless network-indicated location based on the wireless network configuration metadata, wherein the wireless network-indicated location comprises a first pair of geographical coordinates;

determining a GPS-indicated location based on the location data, wherein the GPS-indicated location comprises a second pair of geographical coordinates;

determining a cellular network-indicated location based on the cellular network user data, wherein the cellular network-indicated location comprises a third pair of geographical coordinates; and determining the first user location, wherein the first user location comprises a pair of average coordinates, and wherein the pair of average coordinates indicates a centroid location of coordinates associated with the first pair, the second pair, and the third pair.

15. The method of claim 2, wherein determining the first user location comprises:

determining a wireless network-indicated location based on the wireless network configuration metadata, wherein the wireless network-indicated location comprises a first pair of geographical coordinates;

determining a GPS-indicated location based on the location data, wherein the GPS-indicated location comprises a second pair of geographical coordinates;

determining a cellular network-indicated location based on the cellular network user data, wherein the cellular network-indicated location comprises a third pair of geographical coordinates;

determining an average location of two measurements, wherein the average location of the two measurements indicates a pair of average geographical coordinates, wherein the pair of average geographical coordinates is associated with an average of any two of the first pair of geographical coordinates, the second pair of geographical coordinates, or the third pair of geographical coordinates, and wherein any one pair of geographical coordinates of the first pair, the second pair, or the third pair indicates a location greater than a threshold distance from the average location of the two measurements; and determining the first user location based on the average location of the two measurements.

16. The method of claim 2, further comprising:

receiving a planned location indicator from the mobile device, wherein the planned location indicator includes a description of travel plans for the user and a corresponding planned location of travel; and based on the planned location indicator, generating a set of geographical coordinates and a corresponding range of timestamps within the user profile to enable authentication of the user at the corresponding planned location of travel.

17. One or more non-transitory, computer-readable media storing instructions that, when executed by one or more processors, cause operations comprising:

transmitting a first request to a mobile device associated with a user, the first request comprising a request for network information and location information associated with the user;

receiving, from the mobile device, wireless network configuration metadata and location data based on the first request;

transmitting a second request to the mobile device, the second request requesting cellular network information;

based on the second request, receiving cellular network metadata from the mobile device;

determining a first user location based on the wireless network configuration metadata, the location data, and the cellular network metadata;

retrieving a user profile from a user profile database, wherein the user profile comprises a geographical mapping of user locations previously associated with the user based on wireless network user data, location user data, and cellular network user data;

providing the first user location and the user profile to a machine learning model;

based on providing the first user location and the user profile to the machine learning model, generating an authentication probability, wherein the authentication probability indicates a likelihood that the first user location corresponds to a present location of the user; and based on determining that the authentication probability is less than a threshold authentication probability, transmitting an authentication message to a server, wherein the authentication message indicates a reauthentication request for the user.

18. The one or more non-transitory, computer-readable media of claim 17, wherein the instructions cause operations further comprising:

retrieving, from the user profile database, a plurality of training profiles, wherein each training profile of the plurality of training profiles is associated with a corresponding user of a plurality of users, wherein each training profile of the plurality of training profiles includes a corresponding plurality of locations, and wherein a respective location of the corresponding plurality of locations is associated with a respective authentication indicator indicating whether the respective location is associated with a presence of the corresponding user; and based on providing the plurality of training profiles to the machine learning model, training the machine learning model to output authentication probabilities based on input user profiles and input user locations, wherein the authentication probabilities indicate likelihoods of present locations of users being associated with the input user locations.

19. The one or more non-transitory, computer-readable media of claim 18, wherein the instructions for training the machine learning model cause operations comprising:

determining a corresponding plurality of training timestamps associated with the corresponding plurality of locations for each training profile, wherein each respective timestamp of the corresponding plurality of training timestamps indicates a time associated with determination of the respective location of the corresponding plurality of locations; and based on providing the corresponding plurality of training timestamps and the plurality of training profiles to the machine learning model, training the machine learning model to output the authentication probabilities based on the input user profiles, the input user locations, and timestamps associated with the input user locations.

20. The one or more non-transitory, computer-readable media of claim 19, wherein the instructions cause operations further comprising:

determining a first timestamp associated with a first time of determination of the first user location;

providing the first timestamp to the machine learning model; and based on providing the first timestamp to the machine learning model, generating an updated authentication probability based on the user profile, the first user location, and the first timestamp.

* * * * *